Figure 1:
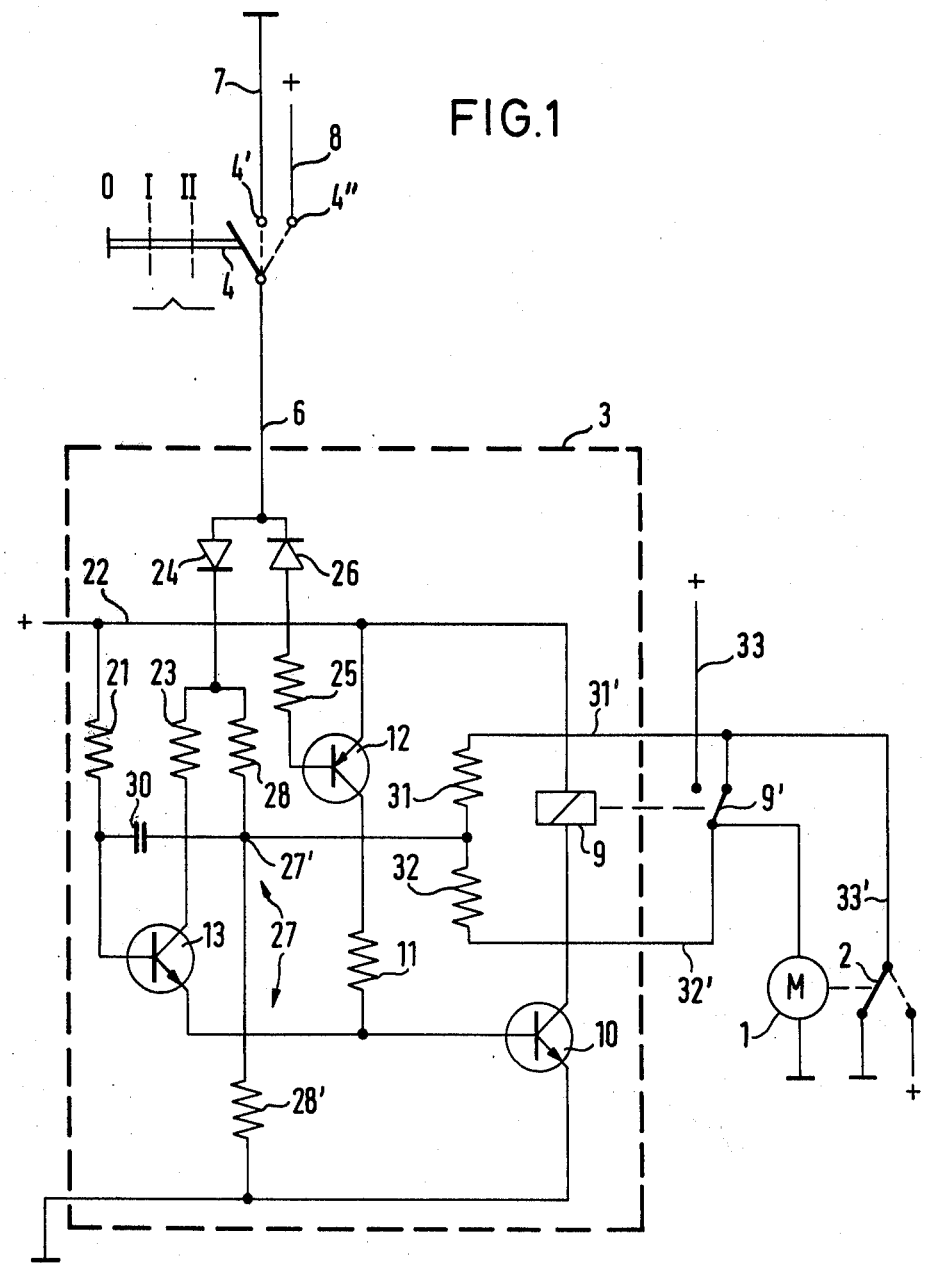

United States Patent [19]

Ditzer

[11] 4,282,445
[45] Aug. 4, 1981

[54] CIRCUIT ARRANGEMENT FOR A WINDOW-CLEANING INSTALLATION OF MOTOR VEHICLES

[75] Inventor: Erich Ditzer, Munich, Fed. Rep. of Germany

[73] Assignee: Bayerische Motoren Werke Aktiengesellschaft, Munich, Fed. Rep. of Germany

[21] Appl. No.: 943,697

[22] Filed: Sep. 19, 1978

[30] Foreign Application Priority Data

Sep. 23, 1977 [DE] Fed. Rep. of Germany ....... 2742888

[51] Int. Cl.³ ............................................... B60S 1/08
[52] U.S. Cl. ................................ 307/141; 15/250.12; 318/443
[58] Field of Search ..................... 15/250.12; 318/443, 318/444, 447, DIG. 2; 307/112, 139, 140, 132 E, 141

[56] References Cited

U.S. PATENT DOCUMENTS

| | | | |
|---|---|---|---|
| 3,351,836 | 11/1967 | Kearns | 318/443 |
| 3,573,585 | 4/1971 | Taylor | 15/250.12 X |
| 3,649,898 | 3/1972 | Inoue | 15/250.12 X |
| 3,657,626 | 4/1972 | Rouvre et al. | 15/250.12 X |

FOREIGN PATENT DOCUMENTS 2505865 8/1976 Fed. Rep. of Germany .
1296993 11/1972 United Kingdom ................. 15/250.12

*Primary Examiner*—Donald A. Griffin
*Assistant Examiner*—W. J. Brady
*Attorney, Agent, or Firm*—Craig and Antonelli

[57] ABSTRACT

A circuit arrangement for a windshield cleaning installation of motor vehicles with a switch which, in one engaging position, connects a program transmitter for one function by way of a control line with one terminal of the power supply and which, in a second engaging position, connects the program transmitter for another function by way of the same control line with the other power supply terminal; the program transmitter is equipped with switching devices for realizing the various functions corresponding to the potential applied to the control line.

14 Claims, 2 Drawing Figures

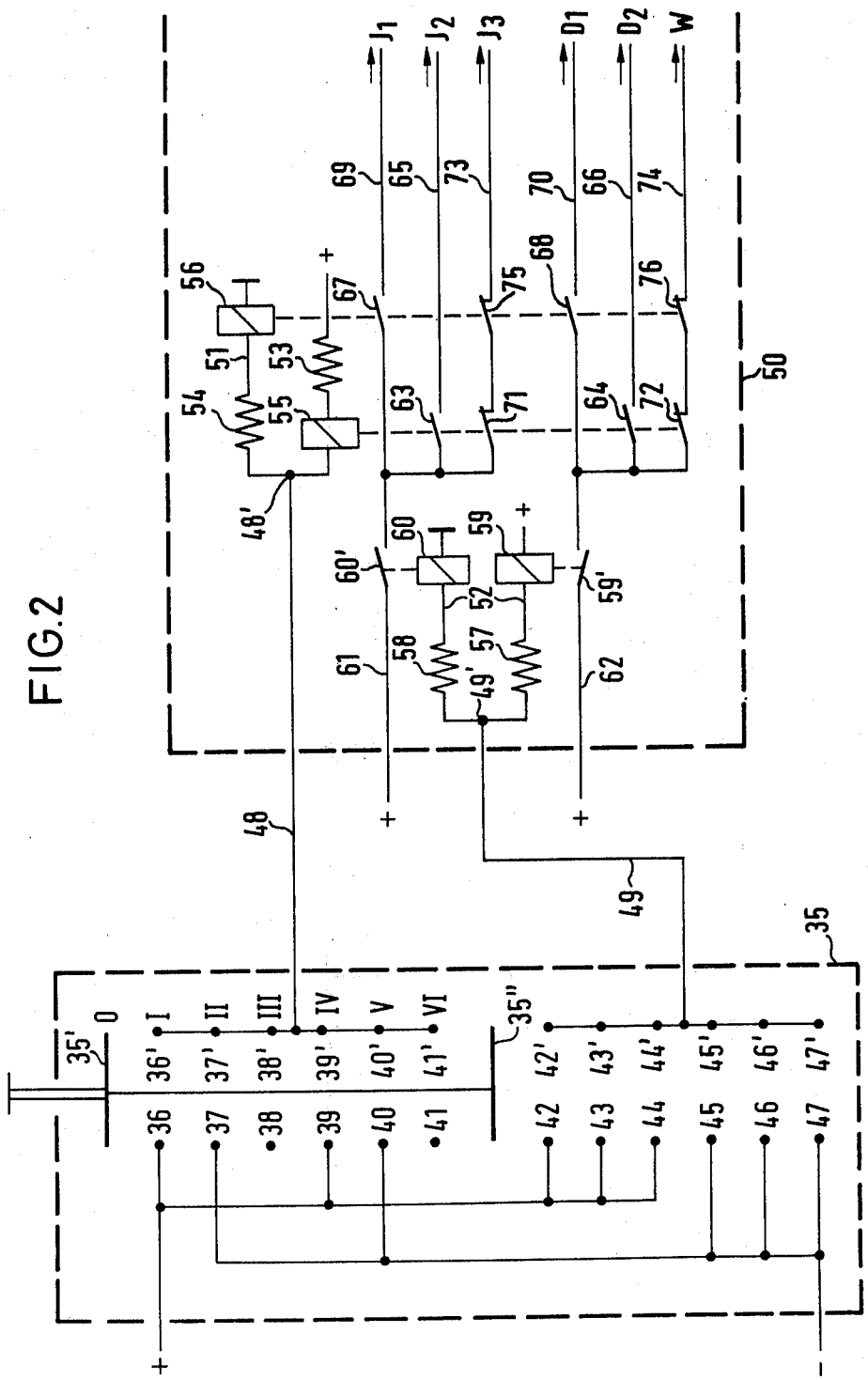

CIRCUIT ARRANGEMENT FOR A WINDOW-CLEANING INSTALLATION OF MOTOR VEHICLES

The present invention relates to a circuit arrangement for a windshield cleaning installation of motor vehicles, with a switch which, in one engaging position, connects a program transmitter for one function of the cleaning installation with a terminal of the power supply by way of a control line.

In a prior art circuit arrangement of this type (German Auslegeschrift No. 25 05 865) the switch includes a second switching member which is actuated independently of the first member and which connects the program transmitter with the other terminal of the power supply by way of a second control line. The interval operation of the windshield cleaning installation is engaged by means of the one switch member and the common operation of a windshield wiper motor and of a washing pump as well as the continued operation of this motor after turning off the washing pump is engaged by means of the other switch member.

The present invention is now concerned with the task to provide a circuit arrangement of the aforementioned type, in which the length of the wire connections between the switch and the program transmitter and the fabrication costs of the switch are kept small. The present invention solves the underlying problems in that the switch, in a second engaging position, connects the program transmitter for another function of the cleaning installation by way of the same control line with the other power supply terminal and in that the program transmitter includes switch means for carrying out the functions corresponding to the voltage application of the control line. Instead of two control lines, thus only a single control line is necessary for both functions of the windshield cleaning system.

The manufacturing and installation costs of the windshield cleaning system is kept small by this double use since the switch as a rule is a steering column switch and the control lines have a considerable length from the steering column to a remotely arranged program transmitter.

The control of the two functions of the cleaning system in the program transmitter takes place in a particularly simple manner from a circuit point of view in that the control line branches off in the program transmitter into two lines, in which one diode each and one control switch changing the switching condition during current flow for one function each of the program transmitter are arranged, whereby the directions of flow (forward directions) of the two diodes are connected mutually opposite. The two diodes uncouple the two control switches and assure that only one of the two functions of the cleaning system is engaged.

According to a further feature of the inventive concept, the switch includes two switch members coupled with each other which in the engaging positions of the switch selectively connect the program transmitter for the functions by way of the two control lines with a respective one of the two power supply terminals each or with one power supply terminal or only by way of one of the control lines with a power supply terminal. A large number of mutually independent functions can be engaged thereby with exclusively two control lines and with two mutually coupled switch members, namely, for a maximum of $3^2 = 9$ switching positions of the switch inclusive the disengaging position, a maximum of eight functions.

Accordingly, it is an object of the present invention to provide a circuit arrangement for a windshield cleaning system of motor vehicles, which avoids by simple means the aforementioned shortcomings and drawbacks encountered in the prior art.

Another object of the present invention resides in a circuit arrangement for windshield cleaning systems of motor vehicles, which is simple in construction, utilizes relatively few parts and minimizes the wiring required therefor.

A further object of the present invention resides in a circuit arrangement for a windshield cleaning system of motor vehicles, in which the amount of wire required between the switch and the program transmitter as well as the cost of the switch can be kept relatively low.

Still a further object of the present invention resides in a circuit arrangement for a windshield cleaning system of motor vehicles, in which a single control line only is necessary to obtain two functions for the cleaning system.

These and other objects, features and advantages of the present invention will become more apparent from the following description when taken in connection with the accompanying drawing which shows, for purposes of illustration only, two embodiments in accordance with the present invention, and wherein:

FIG. 1 is a schematic circuit diagram for a windshield cleaning installation of motor vehicles according to the present invention, in which a switch controls a program transmitter by way of a control line for two functions; and FIG. 2 is a schematic circuit diagram for a windshield cleaning system according to the present invention, in which a switch with two mutually coupled switch members controls a program transmitter for a large number of functions by way of two control lines connected with different terminals of the power supply.

Referring now to the drawings and more particularly to FIG. 1, the circuit arrangement according to FIG. 1 includes a windshield wiper motor 1 with a park position switch 2, a program transmitter 3 and a switch 4 with an engaging position I for the continuous operation and with an engaging position II for the interval operation of the windshield wiper motor 1.

A control line 6 leads from the switch 4 which is constructed, for example, as steering column switch, to the program transmitter 3, whereby ground potential is applied to the program transmitter 3 by way of the control line 6 in the engaging position I and the positive potential connected by way of an ignition switch (not shown) is applied to the program transmitter 3 by way of the control line 6 in the engaging position II. For that purpose, a connecting contact 4' for the engaging position I is connected with the negative terminal of the power supply by way of a separate line or by way of a line 7 already present in the steering column, for example, for the actuation of the horn, and a connecting contact 4" for the engaging position II is connected by way of a line 8 and the ignition switch (not shown) with the positive terminal (+) of the power supply.

The program transmitter 3 includes a relay winding 9 which is series-connected with the collector-emitter circuit of a switching transistor 10 and which switches an operating contact 9' for the current supply to the windshield wiper motor 1.

The emitter-collector circuit of a control transistor 12 is connected to the base of the switching transistor 10 by way of a resistance 11; the collector-emitter circuit of a further control transistor 13 is also connected to the base of this switching transistor 10. The base of the control transistor 13 is connected by way of a resistance 21 with a line 22 which leads to the ignition switch (+). The collector of the control transistor 13 is connected with the control line 6 by way of a resistance 23 and a diode 24, whereby the forward direction of the diode 24 extends toward the control transistor 13.

The base of the control transistor 12 is also connected with the control line 6 by way of a resistance 25 and a diode 26. The forward direction of the diode 26 is opposite to that of the diode 24.

A voltage divider 27 consisting of resistances 28 and 28' is connected between the negative terminal of the power supply and the point of connection between the diode 24 and the resistance 23. The center tap 27' of the voltage divider 27 is connected, on the one hand, with a point between the resistance 21 and the base of the control transistor 13 by way of a condenser 30 and, on the other, with the windshield wiper motor 1 continuously by way of a resistance 32 in a line 32' as well as by way of a parallel resistance 31 in a line 31' and the operating contact 9' in the normal position thereof when relay 9 is de-energized. A line 33' which is connected in series with the line 31', includes the parking position switch 2. The latter connects the line 33' in its normal rest position, i.e. with the wiper arms and blades in the desired parked position, with the negative terminal of the power supply and in its operating position, i.e., when the wiper arms and blades have left their parking positions, with the positive terminal of the power supply.

The switch 4 controls in its first engaging position I the continuous operation of the windshield wiper motor 1 in that it applies ground potential to the base of the control transistor 12 by way of the resistance 25, the diode 26, the control line 6 and the line 7 and therewith controls the control transistor 12 to become conductive. As a result thereof, also the switching transistor 10 is rendered conductive which then continuously energizes the relay winding 9. The relay 9, upon energization, moves its operating contact 9' into the operating (dash line) position thereof, in which it connects the windshield wiper motor 1 with the positive terminal of the power supply by way of a line 33. After return of the switch 4 into its starting position 0, the control transistor 12 becomes non-conductive and therewith also the switching transistor 10 becomes non-conductive. The relay winding 9 is de-energized and the operating contact 9' returns back to its normal (full line) position. The windshield wiper motor 1 then continues to receive positive potential by way of the parking position switch 2 in the operating position thereof until the windshield wiper (not shown) is in its parking position. In this position, also the parking position switch 2 is again in its illustrated normal (full line) position.

In the second engaging position II, the switch 4 controls the interval operation of the windshield wiper motor 1. In this position, the switch 4 applies positive potential to the program transmitter 3 by way of the line 8 and the control line 6. The positive potential is thereby applied by way of the diode 24, on the one hand, to the collector-emitter circuit of the control transistor 13 by way of the resistance 23 and, on the other hand, to the control resistances 28 and 28' of the voltage divider 27. The control transistor 13 becomes conductive since a sufficient voltage exists at its base by way of the resistance 21 connected to the line 22. It thus also controls the switching transistor 10 to become conductive which energizes the relay 9. The relay 9 then supplies the wiper motor 1 with current by way of its operating contact 9' and the line 33.

At the same time, the condenser 30 which had been charged prior to the engagement of the engaging position II of the switch 4 from the line 22 by way of the resistance 21, is discharged since it receives positive potential at its connection 27' by way of the line 6 and the resistance 28, by way of the line 33, the operating contact 9' in the operating position thereof, and the resistance 32, and, as soon as the wiper motor 1 has left the parking position, by way of the parking position switch 2, the lines 33' and 31' as well as the resistance 31.

At the end of the wiping cycle, the wiper motor 1 reaches the parking position. The parking position switch 2 supplies ground potential to the connection 27' by way of the lines 33' and 31' as well as the resistance 31. The condenser 30 is thereby charged again. The bias potential of the control transistor 13 thereby drops below the control value, and the control transistor 13 and therewith the switching transistor 10 then becomes non-conductive. The relay 9 drops off, i.e., becomes de-energized, and the wiper motor 1 remains in its parking position.

The condenser 30 is continued to be charged by way of the resistance 21 and the bias voltage of the control transistor 13 reaches after a predetermined time a sufficient value so that the control transistor 13, with the switch 4 continued to be kept in the engaging position II, becomes conductive together with the switching transistor 10 and again energizes the relay 9. A new wiping cycle starts therewith, which is again interrupted after one operation.

In the circuit arrangement according to FIG. 2, a switch 35 for the windshield cleaning installation includes two switching members 35' and 35" coupled with each other which, in addition to the disengaging position 0, are adapted to be selectively engaged in six engaging positions I–VI. In these engaging positions I–VI, they establish a connection between one input contact 36 to 41, respectively, one input contact 42 to 47 with one coordinated output contact 36' to 41', respectively, 42' to 47'. The input contacts 36 and 39 for the switch members 35' and the input contacts 42 to 44 for the switch member 35" are connected with the positive terminal whereas the input contacts 37 and 40 for the switch member 35' and the input contacts 45 to 47 for the switch member 35" are connected with the negative terminal of the power supply. No potential is applied to the input contacts 38 and 41. The output contacts 36' to 41' are connected together to a control line 48 while the output contacts 42' to 47' are connected together to a control line 49. The control lines 48 and 49 lead to a program transmitter 50, indicated only in part, for the windshield cleaning installation. They are connected with electric lines 51, respectively, 52 which extend each from the positive terminal of the power supply to the negative terminal thereof. One resistance 53 and one relay winding 55 are arranged in the line 51 between the positive terminal and the connecting point 48' of the control line 48 and one resistance 54 and one relay winding 56 between the connecting point 48' and the negative terminal of the power supply. Similarly, one resistance 57 and one relay winding 59 are arranged in the line 52 between the positive terminal and the connecting point 49' of the control line 49 and one resistance 58 and one relay winding 60 between this connecting point 49' and the negative terminal of the power supply. The resistances 53 and 54, respectively, 57 and 58 are so selected that with current flow through both resistances, the relay windings 55 and 56, respectively, 59 and 60, which are connected in series therewith are not energized.

The relay windings 59 and 60 control each a normally open, operating contact 59', respectively, 60' in lines 62, respectively, 61 which are connected by way of the ignition switch (not shown) to the positive terminal of the power supply. The relay windings 55 and 56 control each two normally open, operating contacts 63 and 64, respectively, 67 and 68 in lines 65 and 66, respectively, 69 and 70 as well as two normally closed contacts 71 and 72, respectively, 75 and 76 in lines 73 and 74. The lines 69, 65, and 73, respectively, 70, 66 and 74 are each connected to the line 61, respectively, 62 in parallel to one another. They lead to further elements (not shown) of the program transmitter 50, by means of which one function each of the windshield wiper cleaning installation is engaged in case of control by way of one of the lines 69, 65, 73, 70, 66 and 74. These functions are, for example, three interval operating steps $J_1$, $J_2$, $J_3$ different from one another with different pausing or rest periods, respectively, wiper duration per wiper cycle in connection with the lines 69, 65, and 73 as well as two continuous operating steps $D_1$ and $D_2$ with different velocity of a wiper motor in connection with the lines 70 and 66 and the operation W of a washer pump with time-delayed engagement and disengagement of the wiper motor in connection with the line 74 (wiping-washing operation).

In the engaging positions I–VI of the switch 35, conditioned by the applications of different potentials to the control lines 48 and 49, one of the lines 69, 65, 73, 70, 66 and 74 is connected with the positive terminal of the power supply in the sequence of their enumeration and therewith one respective function of the cleaning installation is initiated. In the engaging position I, positive potential is applied to the lines 51 and 52 by way of the control lines 48 and 49. As a result thereof, the relay windings 56 and 60 are energized whereas the relay windings 55 and 59 remain non-energized. The lines 69 and 70 are closed by the relay winding 56 by means of the operating contacts 67 and 68 and the lines 73 and 74 are opened by means of the normally closed contacts 75 and 76. The lines 65 and 66 continue to remain open, i.e., interrupted, by reason of the non-energized relay winding 55. Since the relay winding 59 is not energized, no current flows through the line 70 notwithstanding the closed operating contact 68 of the relay winding 56. Thus, a current flows exclusively by way of the line 61, the now closed contact 60' and the also now closed contact 67 through the line 69; as a result thereof, the interval step $J_1$ is engaged in the engaging position I of the switch 35.

In the engaging position II of the switch 35, negative potential is applied to the program transmitter 50 by way of the control line 48 and positive potential by way of the control line 49. As a result thereof, the relay windings 55 and 60 become energized whereas the relay windings 56 and 59 remain non-energized. The lines 69 and 73 are interrupted by the open contact 67 of the non-energized relay winding 56, respectively, by the opened, normally closed contact 71 of the energized relay winding 55. The line 65 is closed by the now closed contact 63 of the relay winding 55. No current flows through the lines 70, 66 and 74 by reason of the open contact 59' of the relay winding 59. Thus, current flows exclusively from the line 61 by way of the closed contact 60' of the relay winding 60, the also-closed contact 63 of the relay winding 55 and through the line 65; the second interval step $J_2$ of the windshield cleaning installation is engaged therewith.

In the engaging position III, no potential is applied to the control line 48; as a result thereof, the relay windings 55 and 56 remain non-energized, the lines 69 and 65 remain open as a result of the open contact 67, respectively, 63 whereas the line 73 enables a current flow by the normally closed contacts 71 and 75. Positive potential is applied to line 52 by way of the control line 49; the relay winding 60 is energized and closes the normally open contact 60' whereas the relay winding 59 remains non-energized and prevents by way of its open contact 59' a current flow through the lines 70, 66 and 74. As a result thereof, a current flows exclusively by way of the line 61, the closed contact 60' and the normally closed contacts 71 and 75 through the line 73 and controls the third interval step $J_3$ of the windshield cleaning installation.

In the engaging positions IV–VI, in lieu of the positive potential for the engaging positions I–III, negative potential is applied to the line 52 by way of the control line 49. As a result thereof, the relay winding 59 is energized in lieu of the relay winding 60. Since, in the engaging positions IV–VI, the same potential is applied to the control line 48 as in the engaging positions I–III and since the normally closed and normally open contacts of the relay windings 55 and 56 are arranged in the lines 70, 66 and 74 as in the lines 69, 65 and 73, the same conditions will result for the lines 70, 66 and 74 in the engaging positions IV–VI as for the lines 69, 65 and 73 in the engaging positions I–III. In the engaging position IV, current thus flows exclusively through the line 70, in the engaging position V exclusively through the line 66 and in the engaging position VI exclusively through the line 74.

In addition to the disengaged position 0, thus altogether six functions of the windshield cleaning installation can be controlled by way of exclusively two control lines 48 and 49 by means of seven switch positions of the switch 35. Compared to windshield cleaning installations in which one control line each is required for each function, a considerable reduction of the wire expenditure between switch and program transmitter is thus obtainable by the present invention.

An enlargement of the embodiment illustrated in FIG. 2, to 7 functions, respectively, to 8 functions of the windshield cleaning installation to be engaged by means of the switch 35 is possible in that for each of the switch members 35' and 35", one, repsectively, two further input contacts corresponding to contacts 36 to 41, respectively, 42 to 47 and output contacts coordinated thereto corresponding to output contacts 36' to 41', respectively, 42' to 47' are arranged for one, respectively, two further engaging positions of the switch 35.

No potential is thereby applied to the additional input contacts for the switch member 35" whereas the input contacts for the switch member 35' are connected with the positive, respectively, negative terminal of the power supply. It can be attained by corresponding circuit measures that a current flow takes place in the additional engaging positions of the switch by respectively one of two additional lines corresponding to the lines 69, 65, 73, 70, 66 and 74.

Depending on need, the circuit arrangement according to the present invention can be constructed for two to eight functions.

In lieu of the illustrated circuit arrangement according to FIG. 2 including relay windings and contacts, the same can also be realized with electronic elements corresponding to FIG. 1.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A circuit arrangement for a windshield cleaning installation of motor vehicles, comprising switch means, which in one engaging position operatively connects a program transmitter means for a first opening function of the cleaning installation by way of a control line means with one terminal of power supply, characterized in that the switch means, in a second engaging position, operatively connects the program transmitter means for a second operating function of the cleaning installation by way of the same control line means with the other power supply terminal, and in that the program transmitter means includes switching means for carrying out said first and second operating functions corresponding to the application of the corresponding potential to the control line means.

2. A circuit arrangement according to claim 1, characterized in that the second operating function is the interval operation of the cleaning installation.

3. A circuit arrangement according to claim 1, characterized first and second operating functions of the cleaning installation include continuous operation and interval operation.

4. A circuit arrangement according to claim 1, characterized in that the switching means includes relay means and contact means operated by said relay means.

5. A circuit arrangement according to claim 1, characterized in that the switching means include electronic elements.

6. A circuit arrangement according to claim 5, characterized in that the electronic elements include transistors and diodes.

7. A circuit arrangement according to claim 1, characterized in that the control line means branches into two electric lines within the program transmitter means, one diode means and one control switching means changing its switching condition during current flow being arranged in a respective electric line for a respective function of the program transmitter means, the forward direction of the two diode means being connected mutually opposite.

8. A circuit arrangement according to claim 7, characterized in that the control switching means include control transistors.

9. A circuit arrangement according to claim 1, characterized in that the switch means includes two switch members coupled with each other, which in the various engaging positions of the switch means, operatively connect the program transmitter means for the first and second operating functions by way of two control line means selectively with a respective one of the two power supply terminals or with one power supply terminal or only by way of one of the control line means with one power supply terminal.

10. A circuit arrangement according to claim 7 or 9, characterized in that the switching means includes relay means and contact means operated by said relay means.

11. A circuit arrangement according to claim 7 or 9, characterized in that the switching means include electronic elements.

12. A circuit arrangement according to claim 2 or 3, characterized in that the switch means includes two switch members coupled with each other, which in the various engaging positions of the switch means, operatively connect the program transmitter means for the first and second operating functions by way of two control line means selectively with a respective one of the two power supply terminals or with one power supply terminal or only by way of one of the control line means with one power supply terminal.

13. A circuit arrangement according to claim 12, characterized in that the switching means includes relay means and contact means operated by said relay means.

14. A circuit arrangement according to claim 12, characterized in that the switching means include electronic elements.

* * * * *